(12) United States Patent
Ramirez

(10) Patent No.: US 10,214,882 B1
(45) Date of Patent: Feb. 26, 2019

(54) SEALED VALVE BOX ASSEMBLY AND METHOD OF INSTALLING A SEALING GASKET TO PROVIDE A SEALED VALVE BOX ASSEMBLY

(71) Applicant: Jesus Augusto Ramirez, Fort Lauderdale, FL (US)

(72) Inventor: Jesus Augusto Ramirez, Fort Lauderdale, FL (US)

( * ) Notice: Subject to any disclaimer, the term of this patent is extended or adjusted under 35 U.S.C. 154(b) by 107 days.

(21) Appl. No.: 15/267,366

(22) Filed: Sep. 16, 2016

(51) Int. Cl.
  *E03B 7/09* (2006.01)
  *B23P 19/00* (2006.01)
  *B65D 41/28* (2006.01)
  *B65D 59/02* (2006.01)

(52) U.S. Cl.
  CPC .............. *E03B 7/095* (2013.01); *B23P 19/00* (2013.01); *B65D 41/28* (2013.01); *B65D 59/02* (2013.01); *B65D 2539/00* (2013.01)

(58) Field of Classification Search
  CPC ......... E03B 7/09; B65D 39/007; B65D 59/02; B65D 39/0094; B65D 41/28; B65D 2539/006; B65D 2539/001; B65D 2539/00; B65D 39/0052; B65D 59/00; E02D 29/149
  USPC ........................... 220/378, 803; 215/364, 355
  See application file for complete search history.

(56) References Cited

U.S. PATENT DOCUMENTS

| | | | |
|---|---|---|---|
| 1,989,218 A * | 1/1935 | Villanyi ................. | B65D 39/16 215/364 |
| 2,094,021 A * | 9/1937 | Penn ...................... | B65D 39/16 215/334 |
| 2,827,914 A | 3/1958 | Alters | |
| 4,228,910 A * | 10/1980 | Barre ................. | B65D 39/0047 215/364 |
| 4,440,407 A | 4/1984 | Gagas | |
| 5,702,018 A * | 12/1997 | Montgomery ......... | B65D 39/00 137/854 |
| 6,226,929 B1 | 5/2001 | Gagas | |
| 6,449,908 B2 | 9/2002 | Gagas | |
| 6,688,072 B1 | 2/2004 | Gavin | |
| 6,763,967 B2 | 7/2004 | Calder | |
| 7,004,677 B1 | 2/2006 | Ericksen et al. | |
| 7,703,474 B2 | 4/2010 | Gagas | |

(Continued)

OTHER PUBLICATIONS

"Valve Box Adaptor II", retrieved at http://www.adaptorinc.com/valve-box-adaptor-ii.html.

*Primary Examiner* — Jeffrey R Allen
*Assistant Examiner* — Jennifer Castriotta
(74) *Attorney, Agent, or Firm* — Glenn E. Gold, P.A.; Glenn E. Gold

(57) ABSTRACT

A sealed valve box assembly includes a valve box lid made of a rigid material, a valve box body made of a rigid material, and an annular sealing gasket made of a resilient compressible material. The valve box body has a central opening in which an annular void is created when the valve box lid is inserted therein with a circumferential row of spaced apart vertical protuberances on the valve box lid. The annular sealing gasket has a circumferential row of spaced apart vertical channels matching the circumferential row of spaced apart vertical protuberances such that the vertical channels on the annular sealing gasket interfit with the vertical protuberances on the valve box lid so as to provide an air-tight press-fitted sealed relationship between the valve box lid and valve box body.

15 Claims, 7 Drawing Sheets

(56) References Cited

U.S. PATENT DOCUMENTS

2002/0166291 A1 11/2002 Campbell et al.
2006/0260688 A1 11/2006 Green
2015/0060390 A1* 3/2015 Elder ................. B65D 39/0052
215/364

* cited by examiner

SEALED VALVE BOX ASSEMBLY AND METHOD OF INSTALLING A SEALING GASKET TO PROVIDE A SEALED VALVE BOX ASSEMBLY

FIELD OF THE INVENTION

The present invention relates to accessing underground valves, and, more particularly, is concerned with a sealed valve box assembly and a method of installing a sealing gasket to provide a sealed valve box assembly that prevents entry of debris that would obstruct access to an underground valve.

BACKGROUND OF THE INVENTION

Flow control valves are typically installed on pipelines, such as municipal water lines, buried several feet under the surface of ground or roadway surface. The use of underground valves has resulted in the use of valve box lid and body assemblies to provide a way of obtaining access to the valves without having to dig down in the earth to uncover the valve.

FIG. 1 shows an example of a prior art underground gate valve assembly, generally designated 100, in conjunction with a prior art valve box assembly, generally designated 102, that extends from the gate valve assembly 100 up to the ground or roadway surface (not shown). The prior art valve box assembly 102 has a valve box 104 that defines an enclosed vertical passageway from the gate valve assembly 100 up to the ground or roadway surface. The valve box assembly 102 also has a valve box body 106 at the upper end of the valve box 104 and a valve box lid 108 that seats on and covers the valve box body 104 so as to normally close the vertical passageway of the valve box 104 at its upper end generally flush with the ground or roadway surface. The valve box lid 108 typically has a central aperture 110 with a plug member 112 inserted therein that is removable in order to accommodate use of an extraction tool to lift and remove the valve box lid 108 from the valve box body 106 at the upper end of the valve box 104.

The prior art gate valve assembly 100 typically has an internal gate valve with a rotatable stem 114 extending vertically upward and having a square nut 116 on its upper end. With the valve box lid 108 removed from the upper end of the valve box body 106, a square socket (not shown) on a lower end of an elongated shaft of a tool (not shown) can be extended by a worker from the ground or roadway surface down through the enclosed vertical passageway of the valve box 104 and into a mating relationship with the square nut 116 in order to rotate the stem 114 to open or close the internal gate valve of the gate valve assembly 100. A rim 118 about a lower end of the valve box 104 is seated and supported upon a circular flange 120 secured (in a manner not shown) about and extending radially outward from an upper region of the gate valve assembly 100 such that the vertical passageway of the valve box 104 is also closed at the lower end of the valve box 104.

During periods of heavy rain, it is possible for water, sand, dirt and mud sediment to enter the valve box body, downward past the periphery of the valve box lid, and gradually fill up the enclosed vertical passageway of the valve box body, making maintenance of and accessibility to the underground valve a large problem. Sand, dirt and/or mud sediment settles and packs tightly over time from each rain making it difficult to remove from inside the valve box body. In emergencies this situation creates serious difficulty in turning off the valve; it can literally take hours of labor and heavy equipment to access and operate the valve. Also, in heavy traffic locations valve box lids have been known to popup or eject from their home position on the upper end of the valve box body, resulting in the valve box lid flipping over and being damaged. Further, the tire of a vehicle driving over a loose lid might create a hazardous situation by propelling the loose lid toward pedestrians and passing vehicles.

Accordingly, there remains a need in the art for an innovation that will overcome deficiencies and problems that remain unsolved.

SUMMARY OF THE INVENTION

The present invention is directed to an innovation that overcomes the deficiencies of the known art and the problems that remain unsolved by providing a sealed valve box assembly and a method of installing a sealing gasket to provide a sealed valve box assembly that will prevent entry of debris that would otherwise obstruct access to an underground valve. The sealing gasket once installed on the valve box lid conforms to it and the valve box body of the valve box assembly and becomes sandwiched therebetween so as to provide a sealed valve box assembly that has an air-tight press-fitted seal preventing entry of water and debris. The sandwiched sealing gasket also keeps the valve box lid secure and centered in the valve box body, thereby holding the valve box lid in place and keeping the valve box lid in place by reducing vibrations of the valve box lid from passing vehicles.

In one aspect of the present invention, a sealed valve box assembly includes:
  a valve box lid made of a rigid material, the valve box lid having
    an upper cover portion,
    a lower plug portion, and
    a plurality of vertical protuberances being spaced apart from one another, arranged in a circumferential pattern about the lower plug portion and being integrally connected with the upper cover portion and lower plug portion, the vertical protuberances projecting radially outward from the lower plug portion;
  a valve box body made of a rigid material and defining a central opening therethrough such that the upper valve box lid fits within the central opening so as to define an annular void therein between the valve box lid and valve box body with the annular void only partially filled by the presence of the vertical protuberances on the valve box lid; and
  an annular sealing gasket made of a resilient compressible material, the annular sealing gasket having
    an annular body of a size relative to the annular void to fit in the annular void, and
    a plurality of vertical channels defined on the annular body, being spaced apart from one another, arranged in a circumferential pattern about the annular body matching the circumferential pattern of the vertical protuberances about the lower plug portion of the valve box lid such that the vertical channels on the annular sealing gasket interfit with the vertical protuberances on the valve box lid to provide an air-tight press-fitted sealed relationship between the valve box lid and valve box body.

In another aspect of the present invention, a sealed valve box assembly includes:

a valve box lid made of a rigid material, the valve box lid having
  an upper cover portion of a cylindrical configuration and a first diameter, the upper cover portion defining a top planar surface and an outer cylindrical surface on the valve box lid,
  a lower plug portion of a cylindrical configuration and a second diameter smaller than the first diameter of the upper cover portion and defining a bottom surface on the valve box lid, the upper cover portion having a peripheral rim segment of an annular configuration projecting beyond the lower plug portion and defining the outer cylindrical surface on the valve box lid, and
  a plurality of vertical protuberances being spaced apart from one another, arranged in a circumferential pattern about the lower plug portion and being integrally connected with the upper cover portion and the lower plug portion, the vertical protuberances projecting radially outward from the lower plug portion and terminating short of the outer cylindrical surface on the valve box lid, and the vertical protuberances also projecting radially downward from the peripheral rim segment of the upper cover portion toward and terminating short of the bottom surface on the valve box lid;
a valve box body made of a rigid material, the valve box body having
  an upper rim portion of an annular configuration defining an upper planar surface,
  an upper interior shoulder portion of an annular configuration displaced below the upper planar surface of the upper rim portion and surrounded by and projecting radially inward from the upper rim portion,
  an intermediate neck portion of an annular configuration displaced radially inward from the upper rim portion and projecting downward from to below the upper interior shoulder portion,
  a lower interior shoulder portion of an annular configuration displaced below the upper interior shoulder portion and surrounded by and projecting radially inward from the intermediate neck portion such that the upper rim portion, upper interior shoulder portion, intermediate neck portion and lower interior shoulder portion define a central opening through the valve box body and the upper valve box lid fits within the central opening of the valve box body so as to define an annular void therein between the valve box lid and valve box body with the annular void only partially filled by the presence of the vertical protuberances on the valve box lid; and
an annular sealing gasket made of a resilient compressible material, the sealing gasket having
  an annular body of a size relative to the annular void, between the valve box body and valve box lid with the protuberances thereon, that adapts the annular body to fit in the annular void, the annular body having an outer cylindrical surface engageable with the intermediate neck portion of the valve box body, an annular end surface engageable with the peripheral rim segment of the valve box lid, an opposite end surface engageable with the lower interior shoulder portion of the valve box body, and an inner cylindrical surface engageable with the lower plug portion of the valve box lid, and a plurality of vertical channels defined on the annular body, being spaced apart from one another, arranged in a circumferential pattern about the annular body and extending from the inner cylindrical surface of the annular body and radially outward toward and terminating short of reaching the outer cylindrical surface of the annular body such that the vertical channels on the annular sealing gasket interfit with the vertical protuberances on the valve box lid so that the annular sealing gasket provides an air-tight press-fitted sealed relationship between the valve box lid and valve box body.

In another aspect of the present invention, the peripheral rim segment of the upper cover portion of the valve box lid fits within the upper rim portion of the valve box body and seats upon the upper interior shoulder portion of the valve box body.

In another aspect of the present invention, the top planar surface of the valve box lid is substantially co-planar with the upper planar surface of the upper rim portion of the valve box body.

In another aspect of the present invention, the lower plug portion of the valve box lid fits within and is displaced radially inward from the intermediate neck portion of the valve box body.

In another aspect of the present invention, the plurality of protuberances on the valve box lid project radially outward from the lower plug portion of the valve box lid toward and terminate short of reaching the intermediate neck portion of the valve box body.

In another aspect of the present invention, the plurality of vertical protuberances on the valve box lid project downward from the peripheral rim segment of the valve box lid toward and terminate short of reaching the lower interior shoulder portion of the valve box body.

In another aspect of the present invention, each of the vertical channels on the annular body of the annular sealing gasket is sized relative to each of the vertical protuberances on the valve box lid for individual ones of the vertical channels to interfit with individual ones of the vertical protuberances.

In another aspect of the present invention, the pluralities of vertical protuberances and vertical channels are in the form of one of fins and grooves, peaks and valleys alternating with columns and depressions of arcuate cross-sections, or opposing pairs of columns and depressions of arcuate cross-sections.

In another aspect of the present invention, a method of installing a sealing gasket to provide a sealed valve box assembly includes:
  obtaining a cylindrical valve box lid made of a rigid material having a plurality of spaced apart vertical protuberances arranged in a circumferential row, a cylindrical valve box body made of a rigid material having a central opening, and an annular sealing gasket made of a resilient compressible material having a plurality of spaced apart vertical channels arranged in a circumferential row, wherein the valve box lid with vertical protuberances fit with the valve box body to create an annular void between the valve box lid and the valve box body in which the vertical channels on the annular sealing gasket interfit with the vertical protuberances on the valve box lid so that the annular sealing gasket fits in the annular void and provides an air-tight press-fitted sealed relationship between the valve box lid and valve box body;

rotating the annular sealing gasket relative to the valve box lid to align the vertical channels on the annular sealing gasket with the vertical protuberances on the valve box lid;

sliding the annular sealing gasket over the valve box lid so as to at least partially interfit the vertical protuberances on the valve box lid into the vertical channels on the annular sealing gasket;

placing the valve box lid with the at least partially installed annular sealing gasket in the central opening of the valve box body;

turning the valve box lid with the at least partially installed annular sealing gasket in an oscillatory manner clockwise and counterclockwise; and pushing the valve box lid with the at least partially installed annular sealing gasket downward to insert the valve box lid into the central opening of the valve box body and the annular sealing gasket into the annular void such that the vertical protuberances on the valve box lid interfit with the vertical channels on the annular sealing gasket and the annular sealing gasket becomes press-fitted and seated in place between the valve box lid and the valve box body so as to establish an air-tight press-fitted sealing relationship between the valve box lid and the valve box body.

In another aspect of the present invention, the method further includes turning the valve box lid upside down before rotating the annular sealing gasket relative to the valve box lid to align the vertical channels on the annular sealing gasket with the vertical protuberances on the valve box lid.

In another aspect of the present invention, the method further includes placing the annular sealing gasket above the upside down turned valve box lid before rotating the annular sealing gasket relative to the valve box lid to align the vertical channels on the annular sealing gasket with the vertical protuberances on the valve box lid.

In another aspect of the present invention, the method further includes inserting the annular sealing gasket onto an end of valve box lid adjacent to the vertical protuberances before rotating the annular sealing gasket relative to the valve box lid to align the vertical channels on the annular sealing gasket with the vertical protuberances on the valve box lid.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 2. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
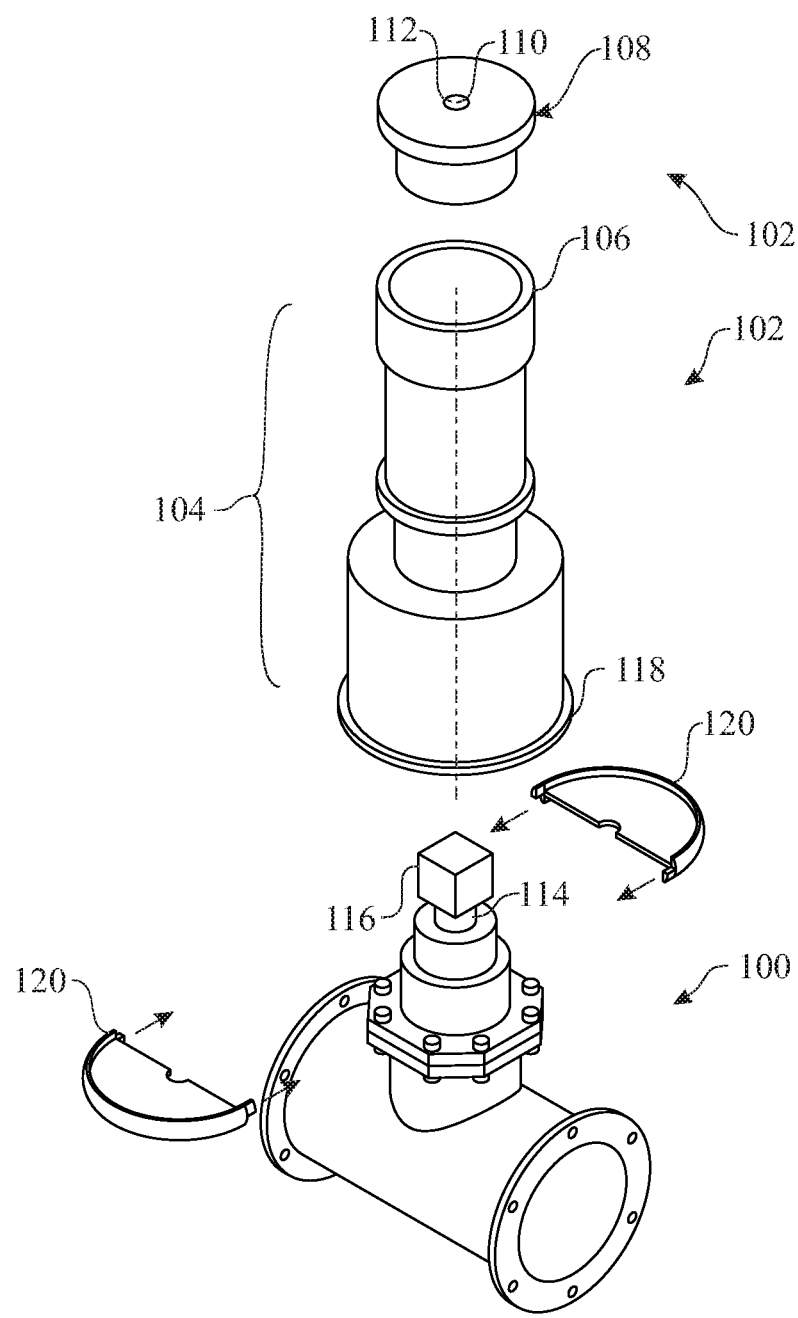
FIG. 1 presents an exploded isometric view of a prior art an underground gate valve assembly in conjunction with a prior art valve box assembly.
Figure 2:
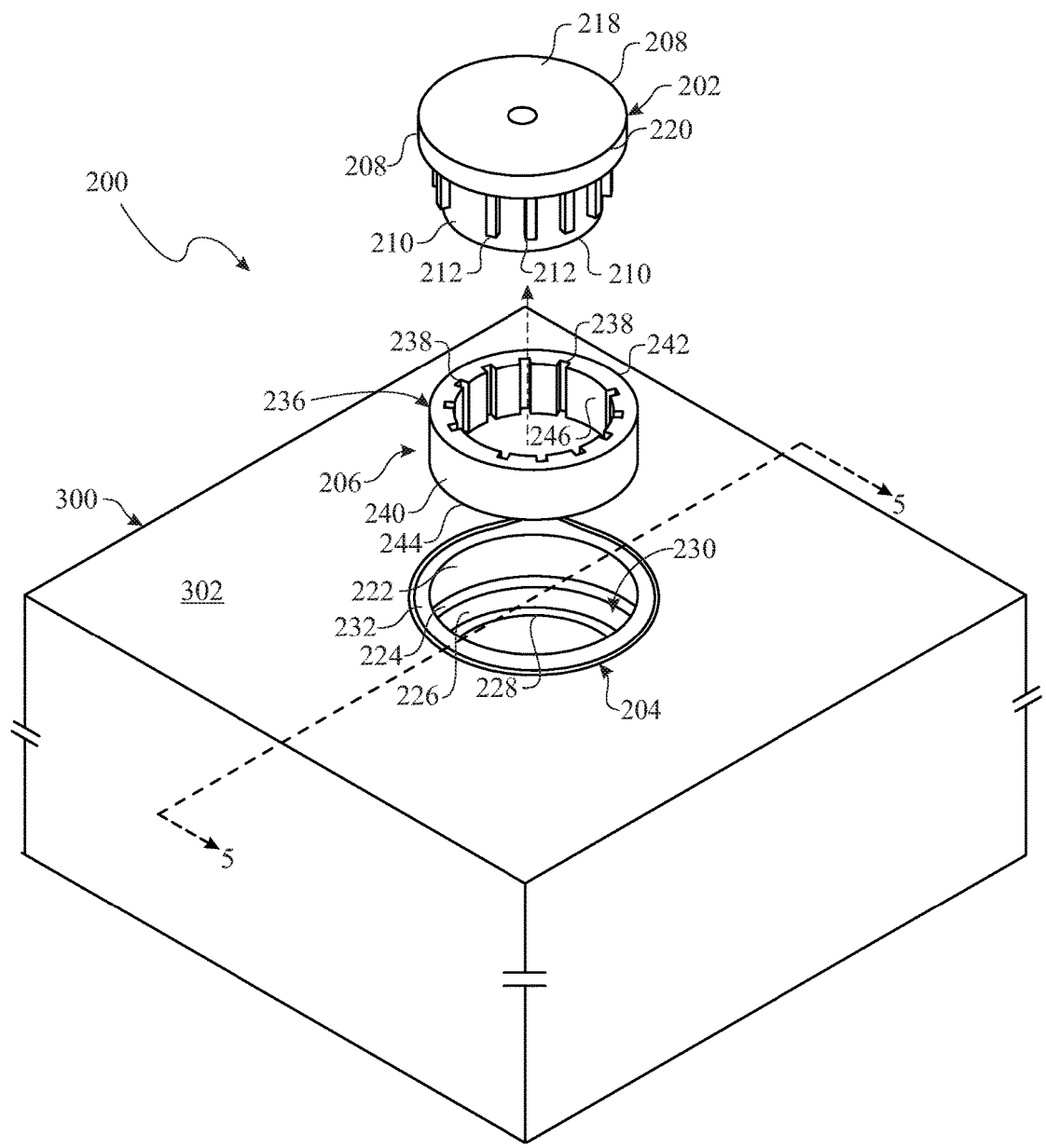
FIG. 2 presents an exploded isometric view of an exemplary embodiment of a sealed valve box assembly in accordance with aspects of the present invention.
Figure 3:
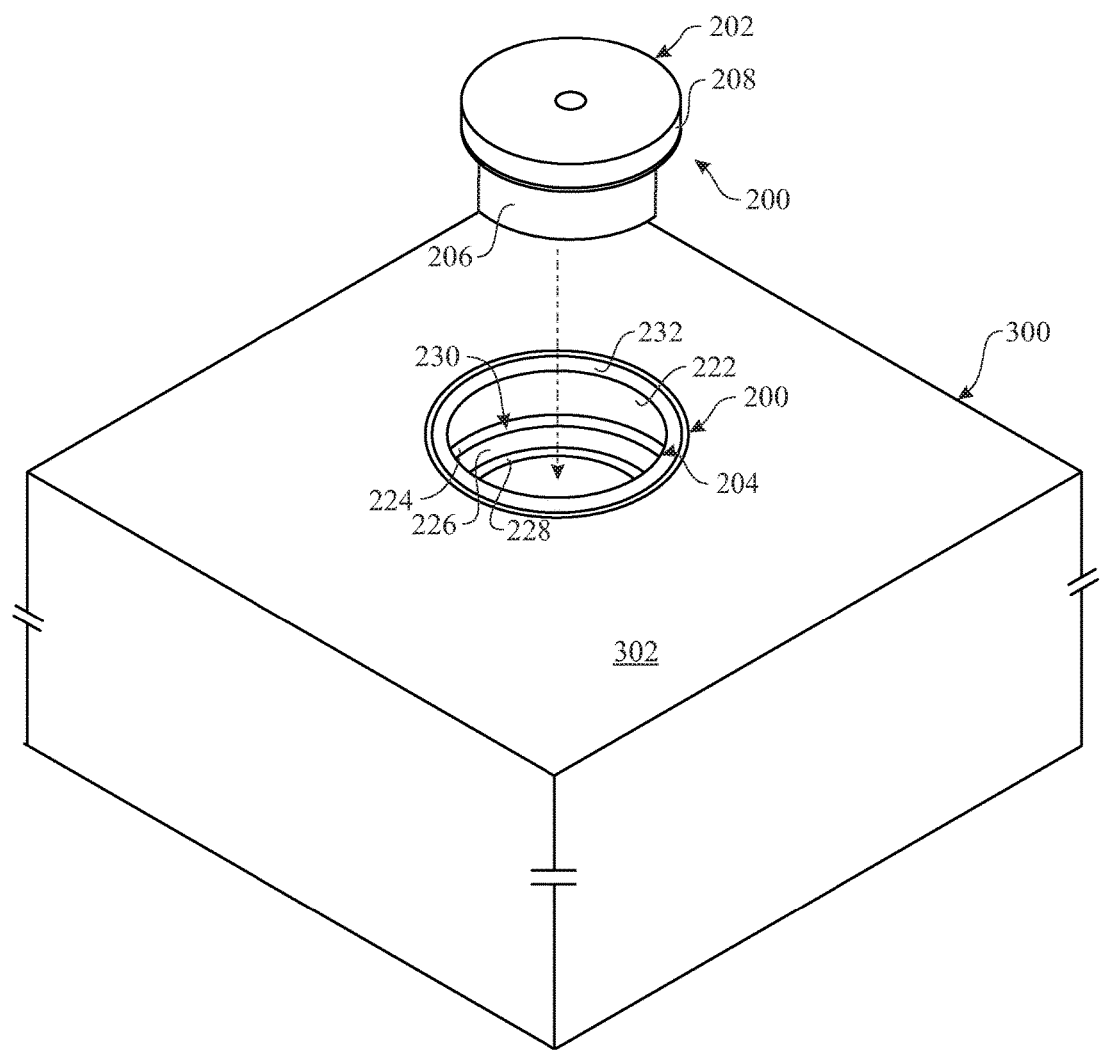
FIG. 3 presents a partially exploded and assembled isometric view of the sealed valve box assembly originally introduced in FIG. 2.
Figure 4:
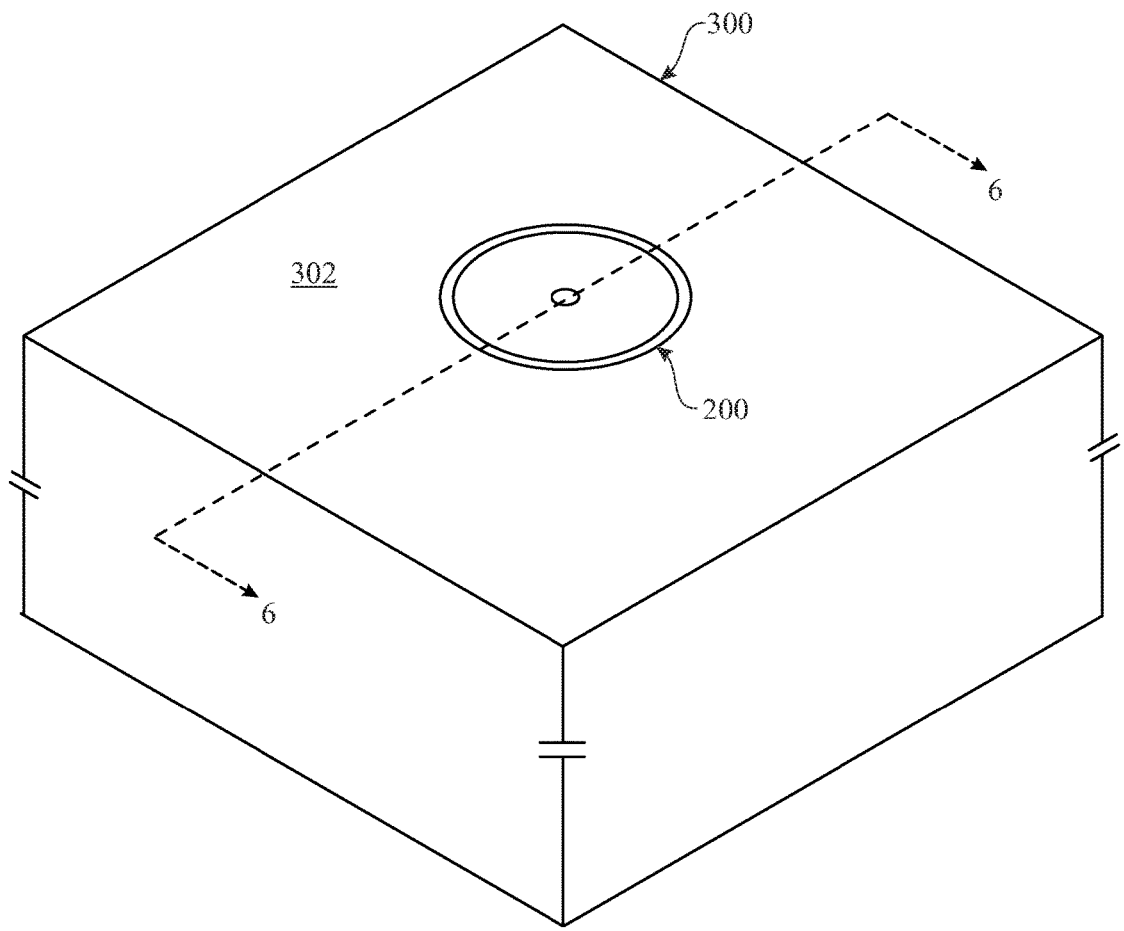
FIG. 4 presents an assembled isometric view of the sealed valve box assembly originally introduced in FIG. 2.
Figure 5:
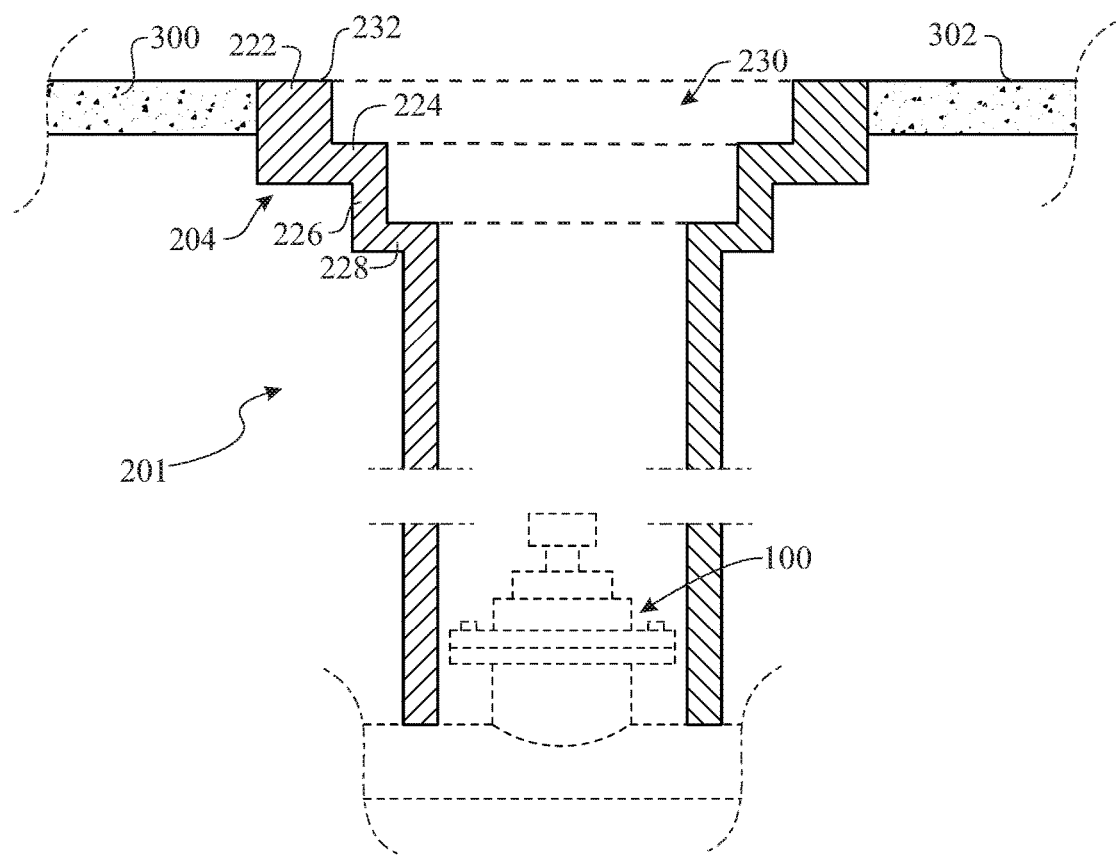
FIG. 5 presents an enlarged section view of a roadway surface and an upper end of a valve box, as taken along section lines 5--5 in FIG. 2, where the sealed valve box assembly is located.
Figure 6:
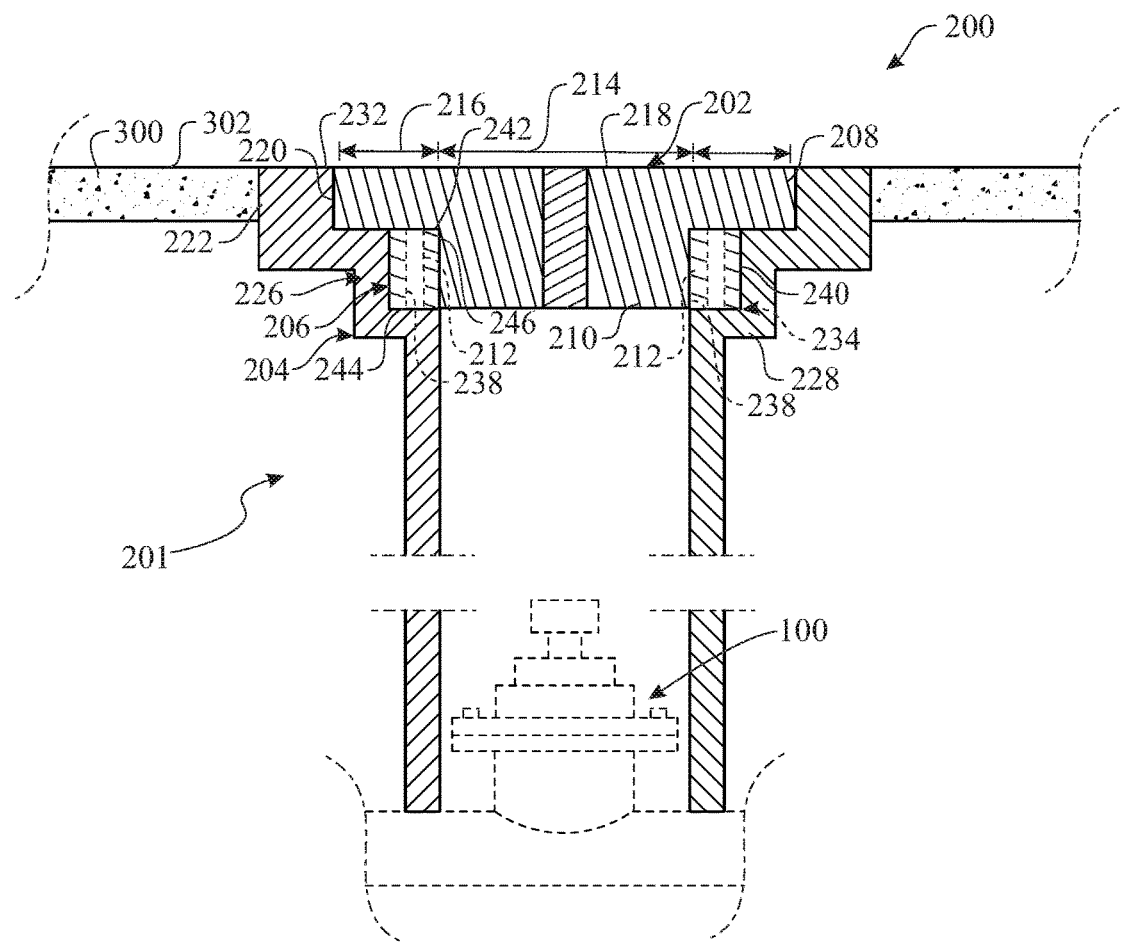
FIG. 6 presents an enlarged section view of the roadway surface and sealed valve box assembly as taken along section lines 6--6 in FIG. 4.

Referring now to FIGS. 2-6, there is illustrated an exemplary embodiment of a sealed valve box assembly, generally designated 200, in accordance with aspects of the present invention. The sealed valve box assembly 200 may be installed in a roadway 300, as best seen in FIGS. 5 and 6, at an upper end of the valve box body 204 of valve box 201 of the sealed valve box assembly 200 of the present invention, which extends downwardly to the prior art gate valve assembly 100, as shown in greater detail in FIG. 1. The sealed valve box assembly 200 includes a valve box 201, a valve box lid 202, a valve box body 204, and an annular sealing gasket 206, as best seen in FIGS. 2 and 6. The valve box lid 202 is made of a rigid, stiff, inflexible material such as a suitable metal. The valve box body 204 is likewise constructed from a rigid, stiff, inflexible material such as a suitable metal. The annular sealing gasket 206 is preferably constructed from a resilient, flexible, compressible material such as rubber or polyethylene foam.

As best seen in FIGS. 2 and 6, the valve box lid 202 of the sealed valve box assembly 200 is formed of an upper cover portion 208, a lower plug portion 210 and a plurality of spaced apart vertical protuberances 212, being integrally connected with one another. The upper cover portion 208 and lower plug portion 210 both have a cylindrical configuration, whereas the lower plug portion 210 has a diameter smaller than the diameter of the upper cover portion 208. The upper cover portion 208 has a central core segment 214 that aligns with the lower plug portion 210, and a peripheral rim segment 216 of an annular configuration surrounding the central core segment 214 and projecting radially outward therefrom beyond the lower plug portion 210. The upper cover portion 208 also defines a top planar surface 218 of the valve box lid 202 on the central core and peripheral rim segments 214, 216, and an outer cylindrical surface 220 of the valve box lid 202 on the peripheral rim segment 216. Also, the vertical protuberances 212 are spaced apart from each other, arranged in a circumferential pattern about the lower plug portion 210, and project radially outward from the lower plug portion 210 below the peripheral rim segment 216 of the upper cover portion 208, terminating short of reaching the outer cylindrical surface 220 of the valve box lid 202 on the peripheral rim segment 216.

As best seen in FIGS. 5 and 6, the valve box body 204 of the sealed valve box assembly 200 has an upper rim portion 222, an upper interior shoulder portion 224, an intermediate neck portion 226 and a lower interior shoulder portion 228 being integrally connected with one another so as together define a central opening 230 therethrough. The upper rim portion 222 of the valve box body 204 has an annular configuration and defines an upper planar surface 232. The upper interior shoulder portion 224 of the valve box body 204 has an annular configuration, is displaced below the upper planar surface 232 of the upper rim portion 222, and is surrounded by and projects radially inward from the upper rim portion 222. The intermediate neck portion 226 of the valve box body 204 has an annular configuration, is displaced radially inward from the upper rim portion 222 and projects downward from to below the upper interior shoulder portion 224. The lower interior shoulder portion 228 of the valve box body 204 has an annular configuration, is displaced below the upper interior shoulder portion 224 and is surrounded by and projects radially inward from the intermediate neck portion 226.

The valve box lid 202 fits in the central opening 230 of the valve box body 204 so as to define an annular void 234 therein between the valve box lid 202 and valve box body 204. In defining the annular void 234, the peripheral rim segment, or portion 216, of the upper cover portion 208 of the valve box lid 202 fits within the upper rim portion 222 and seats upon the upper interior shoulder portion 224 of the valve box body 204, such that the top planar surface 218 of the valve box lid 202 is substantially co-planar with upper planar surface 232 of upper rim portion 222 of the valve box body 204, and with surface 302 of the roadway 300. Furthermore, in defining the annular void 234, lower plug portion 210 of the valve box lid 202 fits within, and is spaced radially inward of, the intermediate neck portion 226 of the valve box body 204, while the spaced apart vertically-oriented protuberances 212 of the valve box lid 202 project radially outward from the lower plug portion 210 of the valve box lid 202 toward, but terminating short of, the intermediate neck portion 226 of the valve box body 204. Moreover, the vertically-oriented protuberances 212 extend downwardly from the peripheral rim portion 216 of the valve box lid 202 toward, but terminating short of, the lower interior shoulder portion 228 of the valve box body 204. Accordingly, it will be readily understood that the annular void 234 (i.e., the space substantially occupied by the annular sealing gasket 206) is only partially occupied by the vertically-oriented protuberances 212 of the valve box lid 202.

As best seen in FIGS. 2 and 6, the annular sealing gasket 206 of the sealed valve box assembly 200 has an annular body 236 with a plurality of spaced apart vertical channels 238 defined therein. The annular body 236 is of a size relative to that of the annular void 234 that adapts the sealing gasket 206 to fit into the annular void 234 between the valve box body 204 and the valve box lid 202 with the vertical protuberances 212 thereon. The annular body 236 of the annular sealing gasket 206 has an outer cylindrical surface 240 engageable with the intermediate neck portion 226 of the valve box body 204, an annular end surface 242 engageable with the peripheral rim segment 216 of the valve box lid 202, an opposite annular end surface 244 engageable with the lower interior shoulder portion 228 of the valve box body 204, and an inner cylindrical surface 246 engageable with the lower plug portion 210 of the valve box lid 202. The vertical channels 238 are spaced apart from each other, arranged in a circumferential pattern about the annular body 236 matching the circumferential pattern of the vertical protuberances 212 about the lower plug portion 210 of the valve box lid 202 such that the vertical channels 238 on the annular sealing gasket 206 interfit with the vertical protuberances 212 on the valve box lid 202 to provide an air-tight press-fitted sealed relationship between the valve box lid 202 and valve box body 204. The vertical channels 238 extend into the annular sealing gasket 206 from the inner cylindrical surface 246 and radially outward toward, and terminating short of reaching, the outer cylindrical surface 240 and also extend axially between the opposite annular end surfaces 242, 244 of the annular sealing gasket 206. Each of the vertical channels 238 on the sealing gasket 206 is sized relative to each of the vertical protuberances 212 on the valve box lid 202 for individual ones of the vertical channels 238 to snugly interfit with individual ones of the vertical protuberances 212 so that the sealing gasket 206 is adapted to provide the air-tight press-fitted sealed relationship between the valve box lid 202 and the valve box body 204 when assembled together to form the sealed valve box assembly 200.

Referring now to FIGS. 2-4 and 6, there is broadly illustrated a sequence of stages during the installing the annular sealing gasket 206 to provide the sealed valve box assembly 200. The valve box lid 202 and annular sealing gasket 206 are turned upside down from their respective positions shown in FIG. 2. With the annular sealing gasket 206 above the valve box lid 202, the annular sealing gasket 206 is inserted onto the end of lower plug portion 210 to the start of the vertical protuberances 212. Then, the annular sealing gasket 206 is rotated relative to the valve box lid 202 to align its vertical channels 238 with the vertical protuberances 212 on the valve box lid 202. This alignment is easily accomplished due to the fact that the vertical channels 238 are open at the opposite annular end surfaces 242, 244 of the annular sealing gasket 206. The annular sealing gasket 206 is then slid down over the valve box lid 202 so as to at least partially interfit the vertical protuberances 212 into the vertical channels 238. The annular sealing gasket 206 once so installed to the valve box lid 202 conforms to it, as best seen in FIGS. 3 and 6. Then, the valve box lid 202 together with the at least partially installed annular sealing gasket 206 are turned over and placed in the central opening 230 of the valve box body 204. Using both hands a user rotates or turns the combination lid and gasket in an oscillatory manner clockwise and counterclockwise while pushing them down with both hands to start the insertion into the central opening 230 of the valve box body 204. The user completes the insertion by applying downward force to the combination lid and gasket, such as by the user stomping thereon, until the valve box lid 202 and gasket 206 become press-fitted and seated in place on the valve box body 204 so as to form an air-tight seal. When the combination lid and gasket are together installed to the valve box body 204, as best seen in FIGS. 4 and 6, the annular sealing gasket 206 becomes compressed and sandwiched between the valve box lid 202 and valve box body 204 so as to provide the sealed aspect of the sealed valve box assembly 200 by establishing the air-tight press-fitted sealed relationship between the valve box lid and body 202, 204. Should an urgent need arise from time to time to make rapid access to the underground flow control valve of the prior art gate valve assembly 100, the sealed valve box assembly 200 will enable a successful response. The compressed and sandwiched annular sealing gasket 206 having prevented entry of water and debris into the valve box 104 of the prior art valve box assembly 102 that leads to the underground valve, thereby enables use of the aforementioned tool to gain rapid access to underground valve. The sandwiched annular sealing gasket 206 also keeps the valve box lid 202 secure and centered in the valve box body 204, thereby holding and keeping the valve box lid 202 in place by reducing vibrations of the valve box lid 202 induced from passing vehicles.

Figure 7:
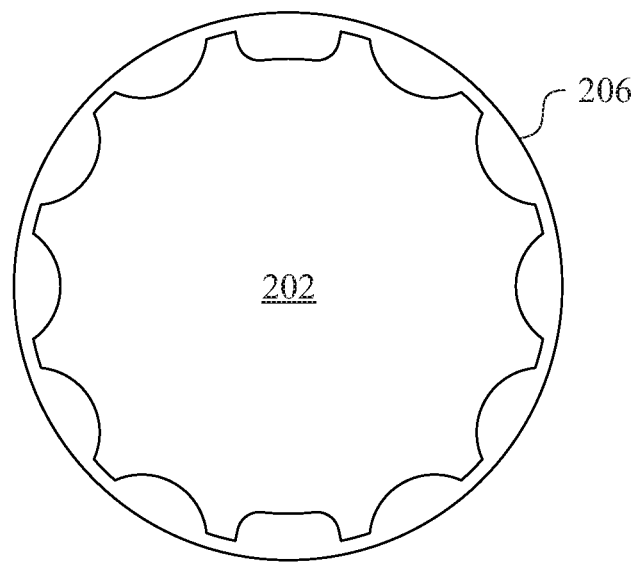
FIG. 7 presents an enlarged plan view of one alternate embodiment of an annular sealing gasket of the sealed valve box assembly, which has a configuration that conforms to the configuration of a valve box lid of one alternate embodiment.
Figure 8:
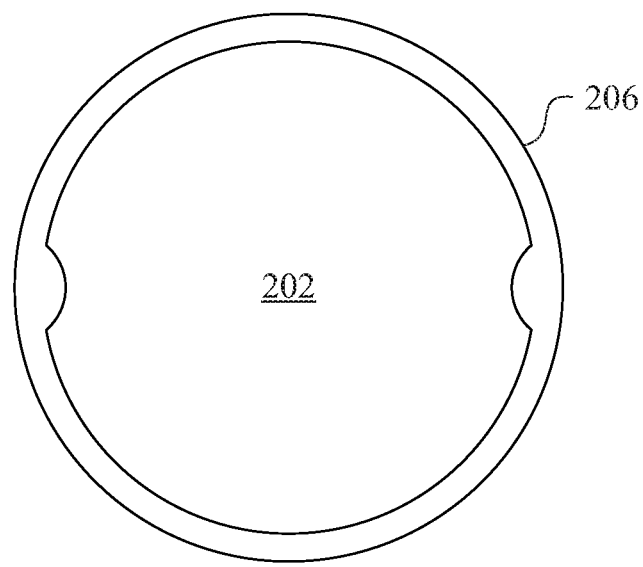
FIG. 8 presents an enlarged plan view of another alternate embodiment of an annular sealing gasket of the sealed valve box assembly, which has a configuration that conforms to the configuration of a valve box lid of another alternate embodiment.

Referring now to FIGS. 2, 7 and 8, there is illustrated several different embodiments of the circumferential patterns of vertical protuberances and vertical channels on the valve box lid 202 and annular sealing gasket 206. In FIG. 2, the pluralities of vertical protuberances and vertical channels are respectively in the form of pluralities of fins and grooves. In FIG. 7, the pluralities of vertical protuberances and vertical channels are respectively in the form of peaks and valleys alternating with columns and depressions of arcuate cross-sections. In FIG. 8, the pluralities of protuberances and channels are respectively in the form of opposing pairs of columns and depressions of arcuate cross-sections.

The above-described embodiments are merely exemplary illustrations of implementations set forth for a clear understanding of the principles of the invention. Many variations, combinations, modifications or equivalents may be substituted for elements thereof without departing from the scope of the invention. Therefore, it is intended that the invention not be limited to the particular embodiments disclosed as the best mode contemplated for carrying out this invention, but that the invention will include all the embodiments falling within the scope of the appended claims.

What is claimed is:

1. A sealed valve box assembly, comprising:
   a valve box lid constructed of a rigid material, the valve box lid comprising a lower plug portion,
      a cylindrical upper cover portion defining a first diameter, the cylindrical upper cover portion having an annular peripheral rim portion extending radially outward beyond said lower plug portion, defining a valve box lid top planar surface and outer cylindrical surface, and
      a plurality of vertically-oriented protuberances spaced apart from one another in a circumferential pattern about said lower plug portion, and integrally connected with said upper cover portion and said lower plug portion, the vertical protuberances projecting radially outward from said lower plug portion;
   a valve box body constructed of a rigid material and defining a central opening extending therethrough and sized such that the upper cover portion of said valve box lid fits within the central opening to define an annular void between the valve box lid and the valve box body, such that the annular void remains partially filled by the vertically-oriented protuberances of said valve box lid; and
   an annular sealing gasket constructed of a resilient compressible material, the annular sealing gasket comprising
      a unitary annular body sized nominally smaller than the respective annular void such that the unitary annular body is accommodated within the annular void, and
      a plurality of vertically-oriented, protuberance-receiving channels defined in an interior surface of said annular body, the protuberance-receiving channels spaced apart from one another and arranged in a circumferential pattern about said annular body interior surface in conformance with the respective circumferential pattern of the vertical protuberances such that the vertical channels extending into the interior surface of said annular sealing gasket are sized, shaped, and otherwise configured for mating engagement with the valve box lid vertically-oriented protuberances to provide an air-tight press-fitted sealed relationship between said valve box lid and said valve box body.

2. An assembly as recited in claim 1 wherein said lower plug portion has a cylindrical geometry defining a second diameter less than the corresponding first diameter of said upper cover portion, the lower plug portion further defining a bottom surface of said valve box lid.

3. The assembly of claim 1 wherein said valve box body further comprises an upper rim portion of an annular configuration defining an upper planar surface.

4. The assembly of claim 3 wherein said valve box body further comprises an annular upper interior shoulder portion downwardly offset from said upper planar surface of said upper rim portion, said annular upper interior shoulder portion surrounded by, and projecting radially inward from, said upper rim portion.

5. The assembly of claim 4 wherein said valve box body further comprises an intermediate neck portion having an annular geometry, said intermediate neck portion offset radially inward from said upper rim portion and extending downward from said upper interior shoulder portion.

6. The assembly of claim 5 wherein said valve box body further comprises a lower interior shoulder portion having an annular geometry, and downwardly offset from said upper interior shoulder portion, said lower interior shoulder portion surrounded by, and projecting radially inward from, said intermediate neck portion such that said upper rim portion, upper interior shoulder portion, intermediate neck portion and lower interior shoulder portion define said central opening through said valve box body.

7. The assembly of claim 1 wherein said pluralities of vertically-oriented protuberances and corresponding respective vertically-oriented channels are in the form of one of fins and grooves, peaks and valleys alternating with columns and depressions of arcuate cross-sections, and opposing pairs of columns and depressions of arcuate cross-sections.

8. A sealed valve body assembly, comprising:
   a valve box lid constructed of a rigid material, comprising an upper cover portion having a cylindrical geometry defining a first diameter, said upper cover portion defining a top planar surface and an outer cylindrical surface of said valve box lid, a lower plug portion integral with said upper cover portion and having a cylindrical geometry defining a second diameter less than the first diameter of said upper cover portion, said lower plug portion defining a bottom surface of said valve box lid, said upper cover portion having an annular peripheral rim portion projecting radially outward beyond said lower plug portion and defining said outer cylindrical surface of said valve box lid, and a plurality of vertically-oriented protuberances spaced apart from one another and arranged in a circumferential pattern about an exterior surface of said lower plug portion, said plurality of vertically-oriented protuberances integrally connected with said upper cover portion and said lower plug portion, together defining a unitary body, said vertically-oriented protuberances projecting radially outward from said exterior surface of said lower plug portion and terminating short of said outer cylindrical surface of said valve box lid, said vertically-oriented protuberances extending downward a distance from an underside of said peripheral rim portion of said upper cover portion toward, but terminating short of, said bottom surface of said valve box lid;

a valve box body constructed of a rigid material, comprising an upper rim portion of an annular configuration defining an upper planar surface, an upper interior shoulder portion of an annular configuration downwardly offset from the upper planar surface of said upper rim portion, and exteriorly radially bounded by said upper rim portion, an intermediate neck portion of an annular configuration offset radially inward from said upper rim portion and extending downward from said upper interior shoulder portion, a lower interior shoulder portion of an annular configuration downwardly offset from the upper interior shoulder portion and exteriorly bounded by said intermediate neck portion such that said upper rim portion, upper interior shoulder portion, intermediate neck portion and lower interior shoulder portion, together, define a central opening through said valve box body, said upper valve box lid fitting within the central opening of said valve box body to define an annular void between said valve box lid and said valve box body, such that said annular void is only partially occupied by the vertically-oriented protuberances of said valve box lid; and an annular-shaped sealing gasket constructed of a resilient compressible material, said annular sealing gasket comprising a unitary annular body sized relative to said annular void, between said valve box body and valve box lid with said vertical protuberances thereon, that adapts said annular body to fit in said annular void, said annular body having an outer cylindrical surface engageable with said intermediate neck portion of said valve box body, an annular end surface engageable with said peripheral rim segment of said valve box lid, an opposite end surface engageable with said lower interior shoulder portion of said valve box body, and an inner cylindrical surface engageable with said lower plug portion of said valve box lid, and a plurality of vertically-oriented channels extending into the inner cylindrical surface of said annular body, in a spaced-apart relationship to one another and arranged in a circumferential pattern about said annular body inner cylindrical surface, said vertically-oriented channels conforming to the corresponding valve box lid vertically-oriented protuberances such that said vertical channels form an interference fit with the vertical protuberances such that said annular sealing gasket provides an air-tight press-fitted sealed relationship between said valve box lid and said valve box body.

9. The assembly of claim 8 wherein said peripheral rim portion of said upper cover portion of said valve box lid fits within said upper rim portion of said valve box body and sits upon said upper interior shoulder portion of said valve box body.

10. The assembly of claim 8 wherein said top planar surface of said valve box lid is substantially co-planar with said upper planar surface of said upper rim portion of said valve box body.

11. The assembly of claim 8 wherein said lower plug portion of said valve box lid fits within and is displaced radially inward from said intermediate neck portion of said valve box body.

12. The assembly of claim 8 wherein said plurality of vertically-oriented protuberances on said valve box lid project radially outward from said lower plug portion of said valve box lid toward, but terminating short of said intermediate neck portion of said valve box body.

13. The assembly of claim 12 wherein said plurality of vertically-oriented protuberances of said valve box lid extend downward from said peripheral rim portion of said valve box lid toward and terminate short of reaching said lower interior shoulder portion of said valve box body.

14. The assembly of claim 8 wherein each of said vertically-oriented channels extending into the annular body of said annular sealing gasket is sized, shaped, and otherwise configured to conform with a corresponding vertically-oriented protuberance of said valve box lid to create an interference fit.

15. The assembly of claim 8 wherein said pluralities of vertically-oriented protuberances and vertically-oriented channels are provided in the form of one of fins and grooves, peaks and valleys alternating with columns and depressions of arcuate cross-sections, and opposing pairs of columns and depressions of arcuate cross-sections.

\* \* \* \* \*